Figure 1:
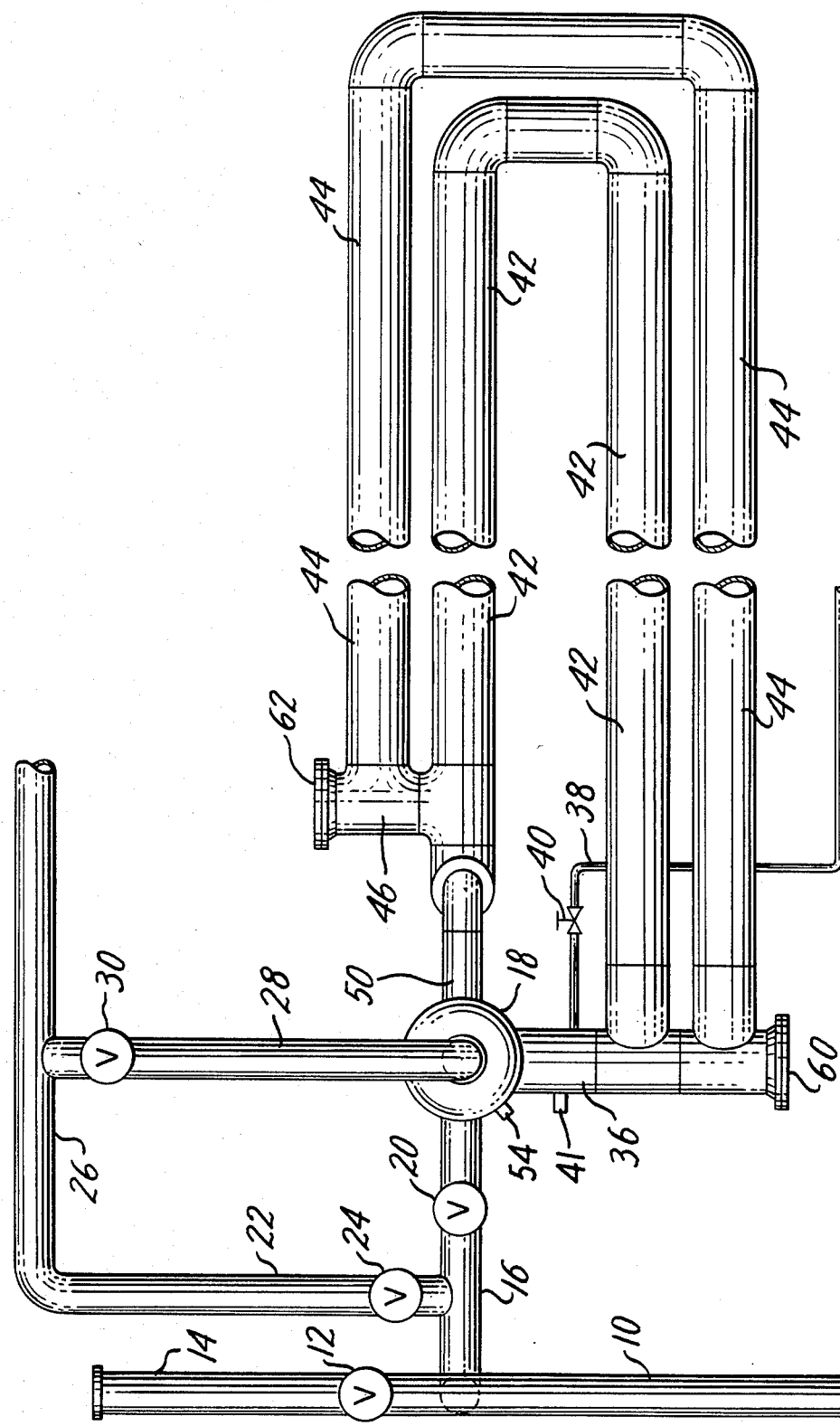

United States Patent [19]

Buls et al.

[11] Patent Number: 4,519,815

[45] Date of Patent: May 28, 1985

[54] SLUG-CATCHING METHOD AND APPARATUS

[75] Inventors: Ronald L. Buls, Spring; James P. Gilcrease, Katy, both of Tex.

[73] Assignee: Texas Eastern Engineering Ltd., Houston, Tex.

[21] Appl. No.: 561,694

[22] Filed: Dec. 15, 1983

[51] Int. Cl.³ .............................................. B01D 19/00
[52] U.S. Cl. .......................................... 55/46; 55/164; 55/185
[58] Field of Search ...................... 55/36, 55, 164, 189, 55/46, 185

[56] References Cited

U.S. PATENT DOCUMENTS 2,571,219  10/1951  De Cew ................................... 55/55
4,160,652  7/1979   Martin et al. ............................ 55/46

OTHER PUBLICATIONS

Fryar, J. R., "Oil & Gas Journal", 3/31/80, pp. 76–79.
Martin, R. E., "Oil & Gas Journal", 4/27/81, pp. 143–148.
Barker, W. F., "Oil & Gas Journal", 12/27/82, pp. 186–192.
Oranje, L., "Oil & Gas Journal", 4/18/83, pp. 128–138.
Huntley, A. R., et al., "Oil & Gas Journal", 9/19/83, pp. 95–100.

Primary Examiner—Charles Hart
Attorney, Agent, or Firm—William C. Long; Riggs T. Stewart; Harold N. Wells

[57] ABSTRACT

Liquids in natural gas pipelines are separated, accumulated and distributed in a system wherein the pipeline contents are introduced into a vertical separation zone, the separated gaseous components are withdrawn from the upper portion of the separation zone and reintroduced into the pipeline at a downstream point, a stream of liquid components is withdrawn from a bottom portion of the separation zone, excess liquid components are introduced into an accumulation zone having a gradually rising slope and extending from the bottom portion of the separation zone to the upper portion of the separation zone, and gas displaced by and disengaged from the liquid in the accumulation zone is introduced into the upper portion of the separation zone, while the liquid is withdrawn and removed at a predetermined rate.

12 Claims, 2 Drawing Figures

SLUG-CATCHING METHOD AND APPARATUS

This invention relates to the handling of fluids in a high-pressure natural gas pipeline system and is more particularly concerned with methods and apparatus for handling such fluids when there are both gaseous and liquid phases simultaneously present in the pipeline.

In the transmission of natural gas in high-pressure, large-diameter pipelines, particularly near the source of the gas, and especially in the case of gas being transmitted onshore from an offshore site, it is well known that the gas in the vapor phase is frequently accompanied by various amounts of hydrocarbons and other compounds which are in the liquid phase and which accumulate in the pipelines. These accumulated liquids interfere with the free flow of the gas and also cause problems when the gas enters a compressor or pump or is passed to a gas-processing plant wherein one or more components are to be separated from it or it is to be otherwise treated. In the operation of modern-day, high-pressure gas pipelines for the transmission of natural gas, it is common to introduce "spheres" or "pigs" into the pipeline to aid in accumulating the liquids into masses, commonly referred to in the industry as "slugs," so that they can be more easily controlled. These spheres or pigs are "launched" into the pipeline at appropriate points and, as they move through the pipeline, propelled by the flowing gas, they accumulate the liquids and push them ahead as slugs in the direction of flow so that the spheres or pigs, in effect, function as pipeline clean-out devices. The use of spheres or pigs reduces the liquid hold-up in the pipeline and thus increases the capacity for gas flow.

The use of spheres or pigs, the movement of which through the pipeline can be monitored in conventional manner, makes it possible to regulate the frequency of the slugs so that they will reach a given point at intervals which can be approximately predetermined. Slugs may, however, be formed and appear on an irregular basis, as a result of natural liquid accumulation, with the natural gas flow causing their displacement along the pipeline. In such a case, the slugs may appear at a given point in a sudden and unexpected manner because there is no readily available means on most pipelines for accurately identifying or monitoring their position in the pipeline at any given time. As mentioned, these slugs of liquids not only reduce the efficiency and capacity of the pipeline, but they cause serious problems and damage when allowed to enter gas compressors or pumps or are passed to a gas-processing plant. Moreover, aside from these considerations, the slugs are frequently composed of valuable liquid hydrocarbons, and it is economically desirable to have these hydrocarbons available for processing apart from the gas-processing operation. It is, therefore, necessary and highly desirable that such slugs be removed from the pipeline for optimum operation of the system and for optimum economic utilization of the contents of the pipeline. It will be apparent, however, that any means for slug removal must be capable of handling not only controlled slugs associated with sphere or pig movement but also those slugs formed by natural accumulation and displaced by the gas flow. Moreover, the removal of the slugs must be accompanied by effective separation of the gaseous components of the pipeline contents from the liquid components forming the slugs while accommodating the operation of downstream gas and liquid-handling facilities. In addition, provision must be made for handling and recovering any liquid which is entrained by the gas and which may be in the form of a mist. Also of importance is the need for a liquid-gas separating system which can be prefabricated and erected on the site with minimum additional labor since extensive on-site fabrication at often remote locations is difficult and costly.

Installations for the removal of slugs from natural gas pipelines, commonly known in the industry as "slug catchers," have been known and employed in connection with the transmission of natural gas and, while generally satisfactory, they have not, as a rule, had all of the desirable characteristics referred to above. Representative examples of slug catchers which have been proposed are described in U.S. Pat. No. 4,160,652; J. R. Fryar, "Oil and Gas Journal," Mar. 31, 1980, pp. 76–79; R. E. Martin, "Oil and Gas Journal," Apr. 27, 1981, pp. 143–148; W. F. Barker, "Oil and Gas Journal," Dec. 27, 1982, pp. 186–192; L. Oranje, "Oil and Gas Journal," Apr. 18, 1983, pp. 128–138; and A. R. Huntley et al, "Oil and Gas Journal," Sept. 19, 1983, pp. 95–100. These proposed slug-catching systems, however, suffer from one or more disadvantages from a practical standpoint in that they are unduly complex, requiring a multiplicity of pipe fittings, or they are not adapted to off-site prefabrication to any great extent, or they are not capable of separating the liquid from the gas to a desired degree, or they are not readily adapted to expansion to accommodate increased capacity if the characteristics of the fluid in the pipeline require such expansion, or they have some equivalent drawback which is of significance in commercial pipeline operations, drawbacks which are well known to persons skilled in the art.

It is accordingly an object of the present invention to provide a method and apparatus for handling and removing slugs from a high-pressure gas transmission pipeline which avoids the disadvantages and drawbacks of prior proposals, particualarly during the receipt of large, high-velocity, high-density slugs.

It is a further object of this invention to provide a slug-catching system for association with a gas pipeline which minimizes the need for pipe fittings and can be largely prefabricated and thus requires a minimum amount of on-site fabrication.

It is another object of the invention to provide a slug-catching system of the character indicated which ensures a high level of separation between the gaseous and liquid components of the pipeline contents introduced into the system during all phases of operation.

It is a still further object of the invention to provide a slug-catching apparatus which is adapted to be readily expanded to increase its capacity for large-volume slugs fed to it from the associated pipeline.

Other objects and features of the invention will be readily apparent to those skilled in the art from the following detailed description of the invention and from the accompanying drawings.

In accordance with the method and the apparatus system of this invention, the total fluid effluent from a natural gas pipeline containing both gaseous and liquid components under the conditions existing in the pipeline is continuously introduced into an intermediate portion of a vertical separation zone wherein the gaseous components of the stream will become disengaged from the liquid components and will move upwardly toward the top of the zone. At the same time, the liquid components in the fluid stream, disengaged from the gaseous components, will move downwardly toward the bottom of the separation zone. The separated gaseous components are withdrawn from the upper part of the separation zone and are reintroduced into the pipeline at a point downstream of the point of introduction of the pipeline contents into the separation zone and the liquid components are gradually withdrawn on a substantially continuous basis at a predetermined rate from the bottom portion of the separation zone for delivery to any point outside the separation zone. When the amount of liquid entering the separation zone exceeds the amount of liquid being withdrawn, as in the case of the arrival of a slug, the excess liquid is diverted into an accumulation zone which has a gradually rising slope and extends from the bottom of the separation zone to a higher portion of the separation zone. Gas disengaged from the liquid in the accumulation zone and/or gas present in the accumulation zone which is displaced by the liquid is introduced into the separation zone at a point lying above the point of introduction of the fluid stream from the pipeline and below the point of withdrawal of the gaseous components from the separation zone. The accumulation zone is characterized by having a continuous upward slope throughout its length and is of essentially U shape so that the discharge end of the zone which communicates with the upper portion of the separation zone is at a significantly higher level than the intake end of the accumulation zone which communicates with the bottom of the separation zone. Upon the arrival of a slug, the accumulation zone becomes essentially filled with liquid which remains in it as the liquid is gradually withdrawn at a suitably controlled rate of withdrawal from the bottom portion of the separation zone. In this way it is possible to maintain a predetermined rate of flow of liquid which will vary in rate only within controlled limits and hence will facilitate operation of downstream liquid-handling facilities.

Figure 2:
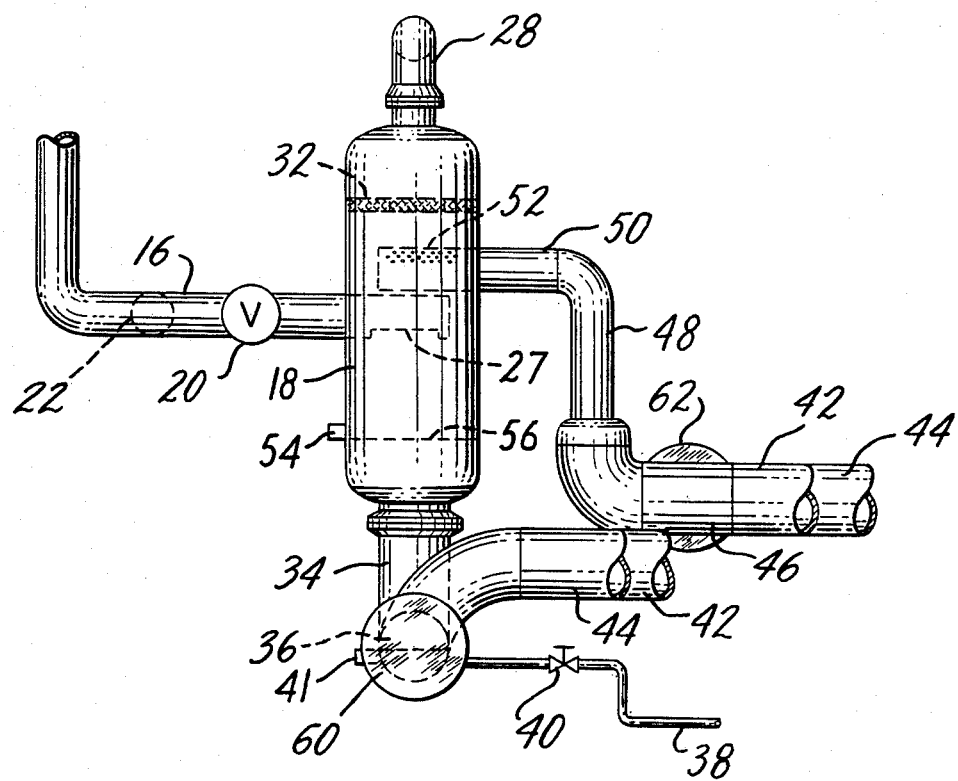

The invention will now be described with particular reference to the accompanying drawings which show a preferred embodiment of a slug-catching system of the invention, and wherein:

FIG. 1 is a somewhat schematic plan view of a slug-catching apparatus assembly associated with a natural gas pipeline and embodying features of the present invention; and FIG. 2 is a partial front elevation of the apparatus assembly shown in FIG. 1.

Referring to the drawings, and particularly to FIG. 1, the reference numeral 10 designates the incoming or upstream portion of a natural gas pipeline of conventional construction adapted to carry fluids under pressure in both the gaseous and the liquid state. The pipeline 10 is connected via a valve 12 to a sphere or pig receiver 14 of any conventional type, for removing spheres or pigs passing through the pipeline when they are employed, so that the pipeline contents can pass freely into the slug-catching apparatus of the invention. Upstream of the receiver 14, the pipeline communicates via a tee with a downwardly and then laterally extending inlet pipe 16 which extends into separator vessel 18. Pipe 16 is provided with a valve 20 for cutting off communication with pipeline 10. A by-pass pipe 22, provided with a valve 24, extends between inlet pipe 16 and the outgoing or downstream portion 26 of the pipeline 10 which will carry onwards the gaseous portion of the contents of pipeline 10 after the liquid portions, particularly liquid slugs, have been removed by the method and apparatus of this invention, as will be described below. The by-pass pipe 22 permits the slug-separating apparatus to be taken out of service for repair or in the event of some emergency situation, without interrupting the operation of the pipeline.

The separator vessel 18 is vertical and advantageously receives inlet pipe 16 approximately midway between its ends. The portion of inlet pipe extending into vessel 18 is cut away along its lower surface as shown at 27 to cause the fluids entering via inlet pipe 16 to be discharged downwardly so that the gaseous components will then reverse direction and flow upwardly as they disengage themselves from the liquid components, ensuring effective separation from the liquid components, which will continue their downward movement. The upper end of separation vessel 18 is provided with a gas discharge pipe 28 which communicates via a valve 30 with the outgoing portion 26 of the pipeline which will carry the essentially liquid-free gas to any desired point downstream of the slug-catching apparatus, such as a gas-processing plant or a compressor or pump. The liquid which is removed during the ordinary operation of the pipeline is primarily the liquid entrained in the gas in the form of mist or droplets. Advantageously, the separator 18 is provided, near the inlet to outlet pipe 28, with a demister device 32 which may be of conventional construction, e.g., in the form of a wire mesh pad, a diversion vane assembly, or the like.

The bottom of vessel 18 is provided with a liquid outlet pipe 34 which communicates with a horizontal manifold 36. The outlet pipe 34 and the manifold 36 will have an internal diameter greater than that of the pipeline 10 and the inlet and gas discharge pipes 16 and 28. A 24" natural gas pipeline is common in this country. In a slug-catching apparatus according to this invention, for use with such a pipeline, the inlet and gas discharge pipes 16 and 28 will suitably be of at least that size, and the liquid outlet pipe 34 will be of a greater size, e.g., 36", as will the manifold 36. The manifold 36, which is, in effect, a bottom chamber for the separating vessel 18, is provided with a liquid draw-off line 38 containing a flow-control valve 40. The line 38 has an inlet positioned in the manifold 36 which allows the line to remove any liquid accumulating in the manifold above a predetermined level, e.g., a level of 5". The operation of valve 40 is controlled by a liquid level sensing device, indicated diagrammatically at 41, which is positioned to monitor the level of liquids contained in the apparatus. Sensing device 41, which can be of any conventional form, initiates the opening of valve 40 whenever the liquid level rises above a preset level, suitably somewhat above the inlet of line 38. Valve 40 is maintained in an open position so long as the liquid level remains above the preset level and is closed when the liquid level again falls to the preset level. A drain valve (not shown) on the bottom of manifold 36 may be provided to permit draining of the manifold, e.g., to remove water, sediment, and the like. Thus, under normal operation of the pipeline, when no slugs are arriving, the relatively small amount of liquid which is separated from a large volume of gas, moves downwardly by gravity in the separating vessel into manifold 36 and is removed via the draw-off line 38 and fed to any desired site, more-or-less at a constant rate which can be determined by the setting of valve 40, if desired.

In accordance with the invention, however, the apparatus of the invention has a unique construction which adapts it to receive, separate and accommodate slugs, whether received regularly or intermittently, and to permit their appropriate disposal and to provide a substantially liquid-free gas to flow onwardly in the pipeline. For this purpose, the manifold 36 is in communication with at least one U-shaped, elongated tubular chamber suitably formed from pipe generally of larger diameter than the pipeline. Advantageously, but not necessarily, it is formed from 36" to 42" pipe, preferably the latter. In the embodiment illustrated there are two U-shaped chambers 42 and 44 which are concentrically arranged. These two tubular chambers are characterized, in accordance with the invention, by the fact that they have a gradual upward slope. The slope does not have to be great, as long as it is a positive, i.e., upward, slope with respect to the horizontal. Preferably it is at least a 0.5% slope, i.e., a rise of one foot in 200 feet of length. Greater slopes may be used, e.g., 1% and 2% slopes, but ordinarily a slope greater than 3% would not be used. While one U-shaped chamber can be provided, preferably at least two of them, as illustrated, are used. Since the U-shaped chamber(s) must in all have a volume at least as great as the largest slug to be encountered in the operation of natural gas pipelines, particularly those carrying natural gas from offshore sources, where separate gas and liquid lines are uneconomical or where condensation occurs in the line, operators predict, from various calculations known in the industry and from experience, how large liquid slugs are likely to be and can proportion the tubular chambers accordingly so that they have the necessary internal volume to accommodate the largest slug to be "caught" and accumulated.

As shown in the drawings, the tubular chambers directly communicate at their lower ends with manifold 36 and similarly communicate at their upper ends with a manifold 46. As a result of the positive slope of the U-shaped chambers 42 and 44, the manifold 46 lies at a significantly higher level in relation to manifold 36. From manifold 46 a riser 48 extends upwardly and communicates with a horizontal inlet portion 50 which extends into separator vessel 18 and is provided with a sparger construction, defined in the embodiment illustrated by a series of openings 52 in its upper surface. It will be seen that the inlet portion 50 lies above inlet pipe 16 but below the gas outlet pipe 28 as well as below the demister 32. The riser 48 and its inlet portion 50 are adapted to receive the gas which is displaced and disengaged from the liquid slug as it passes into and accumulates in the U-shaped tubular chambers. By reason of the positive slope of these chambers, gas displacement and disengagement is facilitated and the free gas is pushed upwardly by the liquid through the chambers into the riser 48 and then into separator vessel 18 from which it is removed, along with the other gas in vessel 18, via demister 32 into gas outlet pipe 28 through which it passes into the ongoing portion 26 of pipeline 10. This co-current flow of gas and liquids in the accumulation zone is a primary reason for the improved capabilities of the invention to receive and accumulate high-velocity, high-density (i.e., nearly all liquid with only minor percentages of entrained gases) slugs without carry-over of liquids with the exiting gas stream. The counter-current flow of gas and liquids in most prior slug catcher constructions promotes re-entrainment of liquids in the gas exiting the accumulation zone during similar operations when the incoming stream is essentially all liquid. Furthermore, the co-current flow eliminates requirements for excess volume in the accumulation zone to allow gas passage and hence reduces the volume required for equivalent slug containment. Furthermore, the upward slope of the tubular chambers inhibits the flow of sediment, sludge, scale, and the like into the accumulation zone and, accordingly, reduces the potential for restriction of liquid and gas flow in the chambers and also reduces the requirement for intermittent cleaning of the tubular chambers.

As will be seen by particular reference to FIG. 2, while the upper leg of each of tubular chambers 42 and 44 at the point of joining manifold 46 is significantly above the height of the lower legs as they join manifold 36, the upper legs are well below the level of inlet pipe 16. As a result, when an arriving liquid slug is received and enters separator vessel 18, the liquids will flow downwardly and then outwardly into the legs of the tubular chambers 42 and 44 solely under the influence of gravity and the hydraulic head which develops, and there is no need for pumping or the application of additional pressure to force the liquid to flow. As previously mentioned, the U-shaped chambers 42 and 44 are dimensioned to accommodate the largest slug expected to arrive at the slug-catching apparatus of the invention during the normal or predicted operation of the pipeline with which the apparatus is associated. To guard against the unexpected, however, and to make provision for coping with an out-size slug, there is provided a high-level detection device indicated diagrammatically at 54 in the drawing. High-level detection device 54 is electrically, pneumatically, or otherwise connected to valve 20, with optional connections to valves 24 and 30. Should the liquid in the slug-catching apparatus rise above a predetermined level, indicated schematically by broken line 56 in separator vessel 18, the high-level detection device 54 will signal the closing of valve 20 so that the pipeline will no longer discharge into separator vessel 18. When the device 54 is also connected to valves 24 and 30, it will also signal the closing of valve 30 and the opening of valve 24 to allow discharge of the pipeline contents into outlet line 26 via by-pass line 22. The slug-catching assembly will then be isolated from the pipeline. When the liquid level in the slug-catcher apparatus falls below a predetermined level, the valves can be reset either automatically on signal from device 54 or by an operator-initiated signal, and normal flow will be resumed. It will also be understood that the valves can be similarly operated independently of device 54 to isolate the assembly for repair or the like. Like the low-level sensing device 41, device 54 is suitably of conventional form. An important advantage of the slug catcher of the invention is that level-detecting devices such as devices 41 and 54 can be closely associated with the valves which they control, which contributes significantly to the smooth operation and safety of the apparatus as a result of the elimination of need for long instrumentation connections required in most previous constructions.

On the other hand, if the flowing conditions in the pipeline undergo permanent changes so that normal flow in the pipeline will regularly provide liquid slugs of greater volume, then the slug catcher of the invention can be easily and readily modified to accommodate the increased slug volume on a regular basis. This is done by adding one or more additional U-shaped tubular chambers corresponding to chambers 42 and 44. For this purpose, the manifolds 36 and 46 are provided, for example, with blind flanges 60 and 62, respectively, to permit the installation of additional manifold sections to receive the ends of the additional U-shaped chambers.

These additional chambers will suitably have the same positive slope as chambers 42 and 44. In addition, if the permanent changes in the pipeline result in a significant increase in the pipeline flowing velocity, e.g., if the flowing volume is significantly increased or the flowing pressure is significantly reduced, the slug catcher of the invention can also be easily and readily modified to accommodate such changes by the incorporation of one or more separator vessels. Such addition is easily accomplished by attaching one or more separator units corresponding to separator vessel 18, outlet pipe 34, and manifold 36, the attachment being effected by joining the new manifold section to the existing lower manifold via blind flange 60. The inlet to the additional separator vessel (S) is suitably provided by branching from the inlet pipe 16. If desired, the added unit can be provided with U-shaped chambers defining additional accumulation zones. Furthermore, the blind flange 60 not only makes it possible to add additional U-shaped tubular chambers and/or additional separator vessel units as just described, but it also permits ready access to the lower manifold interior for physical removal of sediment, sludge, sand, scale, and the like, which may be deposited by the separated liquid and accumulate in the manifold. The abovementioned expansion capabilities and the easy accessibility for cleaning are important practical features of the slug catcher of the invention.

The preferred embodiment of the apparatus of the invention which is shown in FIGS. 1 and 2 of the drawing has been illustrated somewhat schematically and diagrammatically for ease of illustration and to facilitate its understanding and description, but it will be understood that in an actual commercial installation various foundations and supports will be provided for the vessel 18 and the U-shaped chambers 42 and 44 as will be readily apparent to persons skilled in the art. It is a feature of the invention, however, that the number of supports and foundations can be significantly reduced in relation to those necessary for prior slug-catcher proposals involving slug catchers of equal capacity. Furthermore, except for the elongated runs of the pipes defining the chambers 42 and 44, the remainder of the apparatus can be entirely prefabricated and merely assembled and interconnected at the site, e.g., by appropriate use of flanges and the like. The elongated runs of pipe, including the pipes forming the U-shaped chambers which define the slug accumulation zone, can be readily and easily welded at the site in conventional manner.

In operation in accordance with the invention, the fluid to be handled by the apparatus of the invention, such as illustrated in FIGS. 1 and 2, arrives in incoming natural gas pipeline 10. Under normal conditions, the pipeline effluent consists primarily of gaseous components, with only minor amounts of liquid components, largely in the form of entrained droplets and the like. The effluent from pipeline 10 passes into inlet pipe 16 and then into separation chamber 18. By reason of the positioning of the discharge opening of the inner end of pipe 16, the effluent is directed downwardly into separation chamber 18, as a result of which the gas reverses direction and flows upwardly, whereas the liquid becomes disengaged and, under the influence of gravity, falls downwardly through outlet pipe 34 into manifold 36. The gaseous components pass through demister 32 and then flow outwardly through gas discharge pipe 28 to pass into the downstream portion 26 of the pipeline with which the apparatus of the invention is associated.

Meanwhile, the liquid in manifold 36 is withdrawn at any predetermined regular rate via draw-off line 38, flow through which can be controlled by valve 40. Upon the arrival of a slug, the effluent from pipeline 10 becomes essentially all liquid, with only minor amounts of gas mixed with the liquid and, as the liquid is discharged into separation zone 18, it quickly exceeds in volume the quantity that can be handled by draw-off line 38, and this excess flows into the U-shaped chambers 42 and 44. As the flow of liquid from the slug continues, the liquid gradually moves up in the chambers with their positive slope under the influence of gravity and under the influence of the hydraulic head in separation chamber 18. During this flow the gases contained in the liquid gradually become disengaged from the liquid and they too flow up through the chambers co-currently with the liquid. The gases which are displaced by the liquids entering chambers 42 and 44 and the gases which are disengaged from those liquids enter manifold 46, flow into header 48, and are sparged into the upper portion of chamber 18 for passage through the demister and then through discharge pipe 28 for introduction into the outgoing portion 26 of the pipeline. The liquid from the slug continues to accumulate in U-shaped chambers 42 and 44, and if the particular slug being "caught" is of a maximum size, the liquid will reach manifold 46. When the slug has been completely delivered, the normal flow of gas will resume and the process cycle will repeat itself. The slug is removed from chambers 42 and 44 by means of draw-off line 38, flow through which can be adjusted by means of valve 40. The liquids withdrawn from the accumulation zone, defined by chambers 42 and 44, are replaced by gas flowing from the upper portion of vessel 18 via sparger 50, header 48, and manifold 46. If the slug has been sphered or pigged, the spheres or pigs will automatically be collected in sphere or pig receiver 14 in conventional manner. The sphere or pig receiver as well as the pipeline form no part of the present invention and are of conventional construction. As will be apparent from the foregoing, the pressure in the separation chamber 18 is essentially that prevailing in the pipeline and does not affect the operation of the apparatus. The apparatus is of a construction which makes it capable of handling liquid of high density without danger of liquid carryover and, as previously mentioned, the gas discharged from the apparatus via outlet line 28 is essentially liquid-free and suitable for introduction into a gas-processing plant or for passage through a compressor in the pipeline.

It will be understood that various changes and modifications may be made in the embodiments described and illustrated in the drawings without departing from the invention as defined in the appended claims and it is intended, therefore, that all matter contained in the foregoing description and in the drawings shall be interpreted as illustrative only and not as limitative of the invention.

We claim:
1. A method for separating and recovering liquid components from the effluent from a natural gas pipeline containing both gaseous and liquid components under the conditions existing in the pipeline, which comprises (a) introducing the effluent into an intermediate portion of a vertical separation zone wherein the gaseous components of the effluent are disengaged from the liquid components and move upwardly in the zone and the liquid components in the fluid stream, disen- gaged from the gaseous components, moved downwardly toward the bottom of the separation zone; (b) withdrawing the separated gaseous components from the upper portion of the separation zone and reintroducing them into the pipeline at a point downstream of the point of withdrawal; (c) gradually withdrawing on a substantially continuous basis a stream of the liquid components from a bottom portion of the separation zone for delivery to a point outside the separation zone; (d) diverting liquid components in excess of the quantity withdrawn in step (c) into a substantially U-shaped accumulation zone extending entirely substantially horizontally from the bottom portion of the separation zone and having a continuous gradually rising slope extending from substantially the bottom of the separation zone to a point in the upper portion of the separation zone lying above the point of introduction of the fluid stream and below the point of withdrawal of the gaseous components, whereby the liquid components lie at or above the level at which they flow into the accumulation zone; and (e) withdrawing gas displaced by and disengaged from the liquid in the accumulation zone into the upper portion of the separation zone for introduction into the pipeline.

2. A method as defined in claim 1, wherein the pipeline effluent is discharged in a downward direction into said separation zone whereby the gaseous components reverse direction and flow upwardly toward the upper portion of the separation zone.

3. A method as defined in claim 1, wherein liquid in said accumulation zone and gas disengaged therefrom flow co-currently in said accumulation zone.

4. A method as defined in claim 1, wherein entry of pipeline effluent into said separation zone is interrupted upon the liquid in said accumulation zone reaching a predetermined level.

5. A method as defined in claim 1, wherein the liquid in said accumulation zone is removed therefrom by increasing by a predetermined amount the withdrawal of liquid in step (c).

6. A method as defined in claim 1, wherein movement of liquid takes place solely under the influence of gravity and hydraulic heads.

7. Apparatus for separating and recovering liquid components from the effluent from a natural gas pipeline containing both gaseous and liquid components under the conditions existing in the pipeline, which comprises (1) means defining a vertical separation chamber, (2) means connecting an intermediate portion of the separation chamber with a gas pipeline adapted to contain both gaseous and liquid components, (3) means for introducing the contents of the pipeline into the separation chamber, (4) means for withdrawing gaseous components from said separation chamber, said withdrawing means connecting with the pipeline downstream of the means for introducing the pipeline contents into the separation chamber, (5) means for continuously withdrawing a predetermined stream of liquid from the lower portion of the separation chamber, and (6) means for receiving and accumulating liquid in excess of that withdrawn through the last-named withdrawing means, said liquid-receiving and accumulating means comprising means defining at least one tubular, substantially U-shaped chamber extending entirely substantially horizontally and having a continuous gradual upward slope and communicating at its lower end with the lower portion of the separation chamber and at its upper end with the upper portion of the separation chamber at a point above the pipeline contents introduction means and below the means for withdrawing gaseous components from the upper portion of the separation chamber, whereby the stream of liquid will lie at or above its level at the lower end of the accumulating means.

8. An apparatus as defined in claim 7, wherein said means for introducing the pipeline contents is provided with means for discharging said contents in a downward direction into said separation chamber whereby the gaseous components reverse direction and flow upwardly toward the upper portion of the separation chamber.

9. An apparatus as defined in claim 7, wherein each U-shaped chamber has an upward slope from its inlet to its outlet whereby the discharge end of the outlet leg lie at a higher level than the receiving end of the inlet leg.

10. An apparatus as defined in claim 9, wherein the upward slope of each U-shaped chamber is at least 0.5%.

11. An apparatus as defined in claim 7, further comprising means for interrupting entry of pipeline effluent into said separation chamber upon the liquid in said receiving and accumulating means reaching a predetermined level and thereby raising the level of liquid in said separation chamber to a predetermined level.

12. An apparatus as defined in claim 7, wherein the separation chamber is provided with demister means between the point of communication with the upper end of the receiving and accumulating means and the gaseous component withdrawing means.

* * * * *